United States Patent [19]
Hiegel

[11] Patent Number: 6,040,539
[45] Date of Patent: Mar. 21, 2000

[54] PROTECTIVE COVER FOR A COMPUTER MOUSE

[76] Inventor: Todd N. Hiegel, 403 Lake Cliff Dr., Erie, Pa. 16511

[21] Appl. No.: 09/225,514

[22] Filed: Jan. 6, 1999

Related U.S. Application Data

[60] Provisional application No. 60/070,794, Jan. 8, 1998.

[51] Int. Cl.[7] ............................. H01H 9/04; G06K 11/18
[52] U.S. Cl. .......................... 200/302.1; D14/114
[58] Field of Search ................. 200/5 A, 512–517, 200/302.1–302.3, 329, 330, 333; 235/145 R; 345/156–182

[56] References Cited

U.S. PATENT DOCUMENTS

| | | | |
|---|---|---|---|
| D. 291,203 | 8/1987 | Silver | D14/114 |
| D. 370,219 | 5/1996 | Blumer et al. | D14/114 |
| D. 372,906 | 8/1996 | Kawauchi et al. | D14/114 |
| D. 372,907 | 8/1996 | Samborsky | D14/114 |
| D. 381,015 | 7/1997 | Morrison et al. | D14/114 |
| 5,054,063 | 10/1991 | Lo et al. | 379/439 |
| 5,245,146 | 9/1993 | Florence | 200/333 |
| 5,554,963 | 9/1996 | Johler et al. | 299/302.1 X |
| 5,570,112 | 10/1996 | Robinson | 345/163 |
| 5,576,733 | 11/1996 | Lo | 345/163 |
| 5,699,899 | 12/1997 | Kahlbau | 200/302.1 |
| 5,851,623 | 12/1998 | Tarulli et al. | 200/333 X |

FOREIGN PATENT DOCUMENTS 2266759  11/1993  United Kingdom .

Primary Examiner—J. R. Scott
Attorney, Agent, or Firm—Richard C. Litman

[57] ABSTRACT

A protective cover for a computer mouse made of an elastic, flexible material. The material, having a cupped shape, stretches over the top and sides of the mouse, held firmly in place by the elastic action. The bottom of the mouse is left open for proper use. In order to maintain functionality of the mouse buttons, the material is relatively thin. Various indicia may be provided on the cover, which may be transparent or any of a variety of colors. The cover may also be provided with various textures for tactile and aesthetic enhancement.

8 Claims, 2 Drawing Sheets

PROTECTIVE COVER FOR A COMPUTER MOUSE

CROSS-REFERENCE TO RELATED APPLICATION

This application claims the benefit of U.S. Provisional Patent Application Serial No. 60/070,794, filed Jan. 8, 1998, now abandoned.

BACKGROUND OF THE INVENTION

1. Field of the Invention

The present invention relates to a computer mouse accessory. More specifically, the present invention relates to a protective and decorative cover for a computer mouse.

2. Description of Related Art

With the prevalence of computers in all aspects of daily life, the conditions in which computers are put to use are often less than ideal. Computers are found in offices, hospitals, operating rooms, construction sites, and in the rooms of children. Some of the environments are more conducive to computing, while other may be more hostile. One of the most used devices is the computer mouse. If it falls prey to one of the evils of these environments— dust, dirt, blood, coffee, paint, or even a popsicle—a computer user may be left virtually helpless until the mouse is operational again.

Most operations, today, use a computer mouse device for pointing to various items on a computer, rather than typing a set of commands. For this reason, the computer mouse is indispensable. Many computer users have either forgotten or never learned how to use a computer without a mouse. This is complicated by the fact that much software is developed for specific use with a mouse. A device for protecting the outer surfaces and buttons of a mouse is therefore needed. In some situations, such as hospital settings, it may even serve the user to have a removable cover to avoid passing contaminants from user to user via the mouse.

Previous devices have been the subject of patents, but are drawn to more whimsical objectives. U.S. Pat. No. 5,245,146, which issued to Florence on Sep. 14, 1993 discloses a protective cover for a computer mouse having pivotal levers with projections for engaging the pushbuttons. The cover is depicted in the shape of a car. U.S. Pat. No. Design 291,203, which issued to Silver on Aug. 4, 1987 discloses a mouse cover in the shape of a mouse. These patents do not disclose a tight fitting cover that preserves the ergonomic shape of the mouse body, as does the present invention.

Other patents disclose modifications to a computer mouse. U.S. Pat. No. Design 372,906, which issued to Kawauchi, et al. on Aug. 20, 1996, discloses an adjustable mouse, which apparently supports a wrist at various angles. UK Patent Application 2,266,759 A, published Nov. 10, 1993, discloses a computer mouse carrying advertising or decoration in which the advertising is carried below a clear plastic window on the body of the mouse.

Still other patents disclose new mouse designs. U.S. Pat. No. Design 370,219, which issued to Blumer et al. on May 28, 1996, discloses a Mickey Mouse shaped computer mouse. U.S. Pat. No. Design 381,015 issued on Jul. 15, 1997 to R. Q. Morrison et al. describes an ornamental design for a computer mouse cover. U.S. Pat. No. 5,576,733, which issued to Lo on Nov. 19, 1996, discloses an ergonomic computer mouse which is used in an upright position. U.S. Pat. No. 5,570,112, which issued to Robinson on Oct. 29, 1996, discloses an ergonomic computer mouse having a soft foam rubber surface for supporting the palm and wrist.

Other patents such as U.S. Pat. No. Design 372,907, which issued to Samborsky on Aug. 20, 1996, disclose protective covers for computer keyboards or monitors, without mention of protection for the mouse.

Despite previous efforts, there is still a need for a simple, easy to use, replaceable, protective cover for a mouse. Additionally, such mouse would be beneficial if provided with decorative indicia or surface texture for tactile enhancement or both.

None of the above inventions and patents, taken either singly or in combination, is seen to describe the instant invention as claimed.

SUMMARY OF THE INVENTION

Accordingly, it is a principal object of the invention to provide a removable protective cover for a computer mouse.

It is another object of the invention to provide a tight fitting cover that does not hinder mouse performance.

It is a further object of the invention to decorative indicia to the surface of the cover.

It is an object of the invention to provide improved elements and arrangements thereof in a protective cover for the purposes described which is inexpensive, dependable and fully effective in accomplishing its intended purposes.

The present invention is a protective cover for a computer mouse. The cover is made of elastic, flexible sheet material. The sheet material, having a cupped shape, stretches over the top and sides of the mouse, held firmly in place by the elastic action. The bottom of the mouse is left open for proper use. In order to maintain functionality of the buttons, the material is relatively thin. Various indicia may be provided on the cover, which may be transparent or any of a variety of colors. The cover may also be provided with textures for tactile and aesthetic enhancement. The cover may be removed for cleaning or disposal, depending upon use.

The mouse cover is designed to protect the surface of the mouse from multiple users and contaminants such as blood, dust, and popsicle syrup. The simple design makes it useful in many environments, including as a novelty item.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
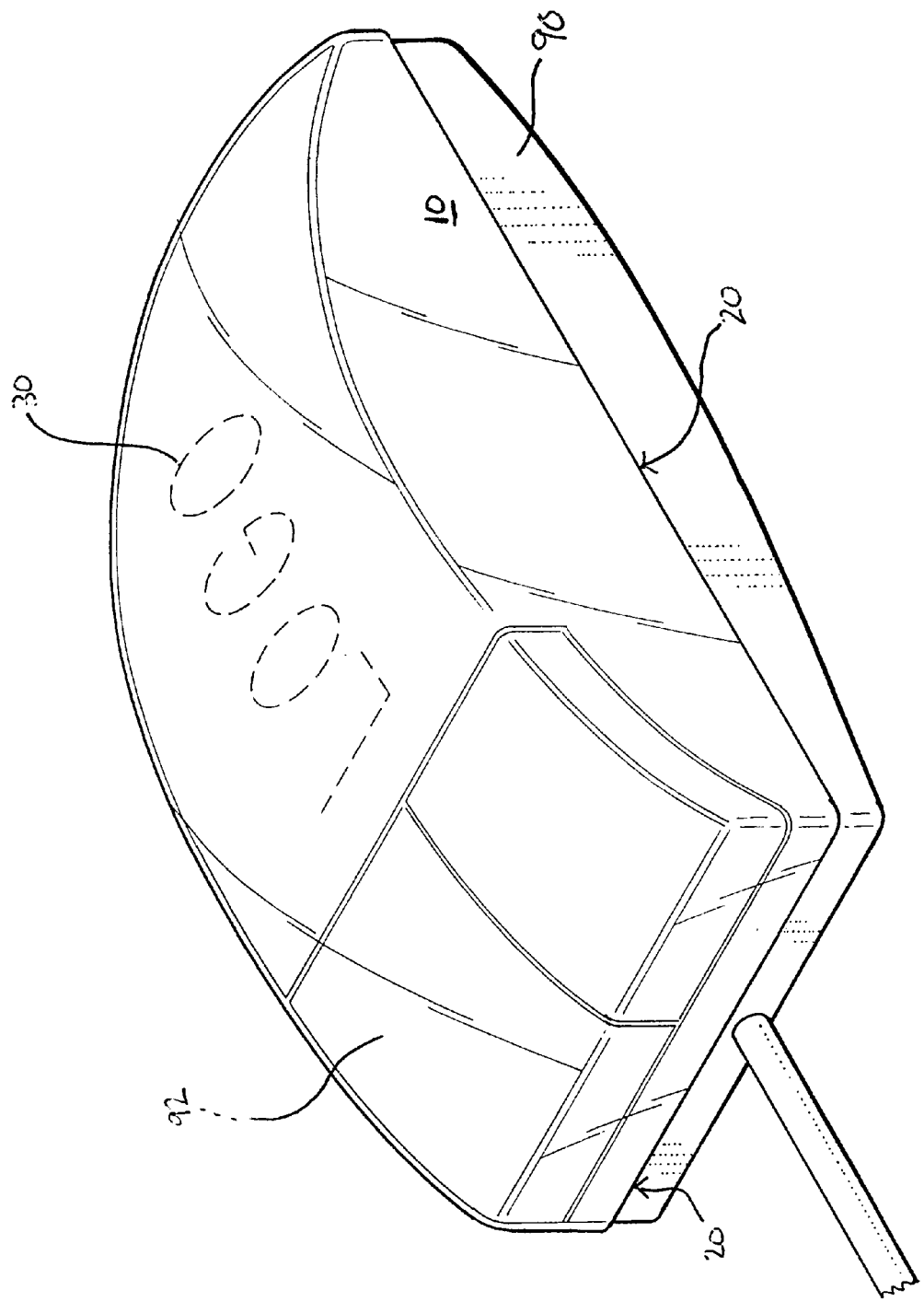
FIG. 1 is an environmental, perspective view of a protective cover for a computer mouse according to the present invention.
Figure 2:
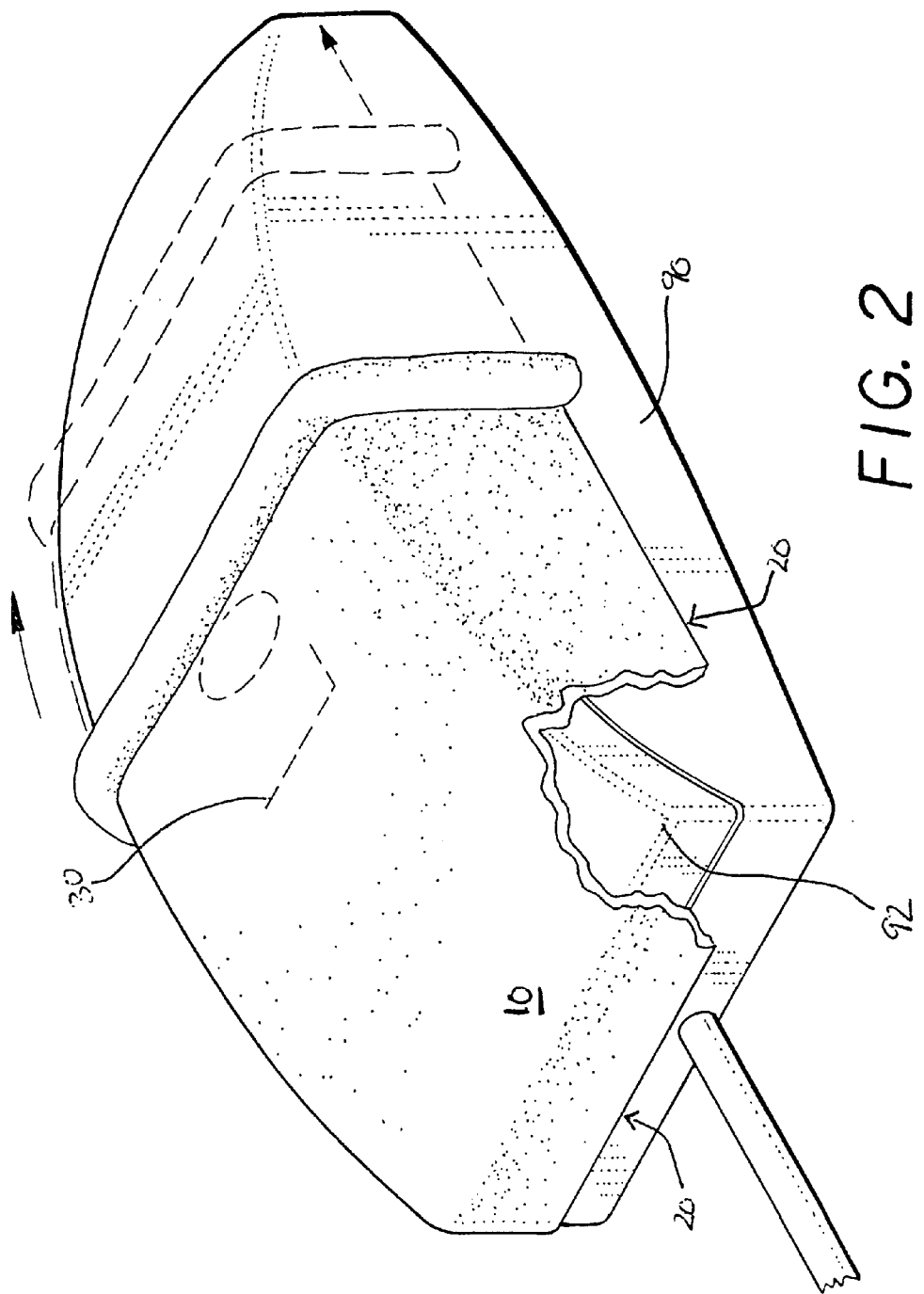
FIG. 2 is an environmental, perspective, partial cut-away view of the mouse cover according to the present invention.

Referring now to the figures by numerals of reference, a protective cover 10 for a computer mouse 90 is shown. The cover 10 may be made of various sizes and shapes to complement any of a variety of mouse shapes, sizes, and designs. In any case, the cover 10 is constructed of a thin, flexible, elastic material, such as, but not limited to, plastic or rubber. A preferred material is latex or silicone rubber. The cover 10 has smaller dimensions than the mouse 90 that is intended to be covered. This is to allow the cover 10 to be stretched tautly across the mouse 90.

The cover 10 has a cupped shaped for engaging the sides of the mouse 90 and to be form-fitting to the form of the mouse. One end of the cover 10 may be affixed to the mouse 90 and the other rolled and stretched across the mouse 90. The elastic nature of the material used in the cover 10 insures a tight fit, and insures the shape-hugging feature of the invention. It is important to note that the edges 20 of the cover 10 engage the sides of the mouse 90, and do not reach any part of the underside of the mouse 90, where they might hinder movement of the mouse 90. The tight fit and shape hugging nature of the mouse cover 10 as well as its flexible nature allow for activation of the mouse button(s) 92 through the cover 10.

The cover 10 may be provided with various textures for greater tactile appeal and aesthetic charm. The material used to construct the cover 10 may come in any of a variety of colors, or even be transparent. Similarly, the cover 10 may be imprinted with various indicia 30 such as logos or other graphics.

The cover 10 acts like a protective skin over the body of the mouse 90. An advantage to the cover 10 is that it may be removed to reveal an unsoiled mouse and thus act as an anti-microbial agent. The cover 10 may be reusable or disposable depending upon its application. If reusable, the cover 10 may be washed and reinstalled on the mouse 90. Alternatively, the exterior surface of the cover 10 is impregnated, coated or otherwise treated with an anti-microbial substance, which repeatedly protects the mouse 90 from some of the most hostile environments. These features may be particularly useful in industrial, medical, and food service applications.

The cover 10 may also be used as a novelty item, changing covers depending on the season, or upcoming holiday, etc. Some decorative indicia 30 or logos that may be used include sports team logos or company logos. Humorous or decorative indicia may also be used to capture other markets.

The protective cover of the present invention conforms to the contour of the computer mouse, therefore, the protective cover can be readily used with an ergonomic mouse or a specially configured mouse without the loss of mouse topography. When covering a mouse, especially an ergonomic mouse, it is essential that the contour of the mouse not be distorted by the cover because any loss in tactile perception impairs the proper operation of the mouse by the user. Thus, the snugly fitting protective cover of the present invention mimics the shape of the computer mouse thereby ensuring proper tactile perception by the user.

It should be understood by those skilled in the art that various modifications and adaptations to the present invention as well as alternative embodiments of the present invention may be contemplated. The preferred embodiments of the present invention disclosed herein are intended to be illustrative only and are not intended to limit the scope of the invention. It is to be understood that the present invention is not limited to the embodiments described above, but encompasses any and all embodiments within the scope of the following claims.

I claim:

1. In combination with a computer mouse having a top, a bottom, and sides, a cover comprising:

a flexible, elastic material having smaller dimensions than said mouse that when stretched covers the entire top of said computer mouse and a portion of each side of said computer mouse such that said cover is secured to said mouse by the tension of said material against said sides of said mouse caused by the stretching of said material into position such that said material snugly fits and conforms to the contour of said mouse, whereby said top of said mouse is protected from potential contaminants, and said bottom of said mouse is left free for proper use.

2. The combination of claim 1 wherein said flexible, elastic material is cupped for gripping said sides of said mouse.

3. The combination of claim 1, wherein said flexible, elastic material is rubber.

4. The combination of claim 3 wherein said rubber is selected from the group consisting of silicone and latex.

5. The combination of claim 1, wherein said cover is provided with decorative indicia.

6. The combination of claim 1, wherein said cover is provided with various surface textures for tactile enhancement.

7. The combination of claim 1, wherein said mouse has at least one operating means and that the fit of said material on said mouse is such that said material conforms to the contour of said at least one operating means.

8. The combination of claim 1, wherein said flexible, elastic material is treated with an anti-microbial substance.

* * * * *